United States Patent
Schelhas et al.

(10) Patent No.: US 6,672,288 B1
(45) Date of Patent: Jan. 6, 2004

(54) SUPPLY UNIT

(75) Inventors: Peter Schelhas, Stuttgart (DE); Dietmar Schmieder, Markgroeningen (DE); Willi Strohl, Beilstein (DE); Albert Gerhard, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/463,195

(22) PCT Filed: Apr. 16, 1998

(86) PCT No.: PCT/DE98/01067
§ 371 (c)(1),
(2), (4) Date: Jan. 19, 2000

(87) PCT Pub. No.: WO99/09312
PCT Pub. Date: Feb. 25, 1999

(30) Foreign Application Priority Data

Aug. 14, 1997 (DE) .......................................... 197 35 272
Mar. 7, 1998 (DE) .......................................... 198 09 919

(51) Int. Cl.⁷ ............................................................. F02M 33/04
(52) U.S. Cl. ........................................................ 123/509
(58) Field of Search ................................ 123/509, 510, 123/495, 497

(56) References Cited

U.S. PATENT DOCUMENTS

| | | | | |
|---|---|---|---|---|
| 4,974,570 A | * | 12/1990 | Szwargulski et al. | 123/509 |
| 5,564,396 A | * | 10/1996 | Kleppner et al. | 123/509 |
| 5,758,627 A | * | 6/1998 | Minagawa et al. | 123/509 |
| 5,769,061 A | * | 6/1998 | Nagata et al. | 123/509 |
| 5,782,223 A | * | 7/1998 | Yamashita et al. | 123/510 |
| 5,809,975 A | * | 9/1998 | Tuckey et al. | 123/509 |

FOREIGN PATENT DOCUMENTS

DE  37 30930 A1  3/1989

* cited by examiner

Primary Examiner—Thomas N. Moulis
(74) Attorney, Agent, or Firm—Michael J. Striker

(57) ABSTRACT

In a feed unit for delivering fuel from a supply tank (10) with a filter cup (13) having a central chamber (14) and an annular chamber (15) enclosing the latter, with a filter cover (30) which closes the annular chamber (15) and which contains an inlet duct (36) to the annular chamber (15) and an outlet duct (37) from the annular chamber (15), and with a feed pump (22) which is inserted in the central chamber (14) and which projects with a suction connection piece (26) through an opening (20) into a suction space (19), assembly is simplified and manufacturing costs are reduced in that the clearance diameter of the central chamber (14) is dimensioned so as to be greater than the outer diameter of the pump housing (23), and an axially projecting pressure connection piece (27) is formed at the other end side of the housing (23) remote of the suction connection piece (26) and a mounting cap (38) which engages over the pressure connection piece (27) is formed at the filter cover (30). A flexible sleeve (39, 28) is inserted between the pressure connection piece (27) and the mounting cap (38) on the one hand and the suction connection piece (26) and opening (20) in the cup base (131) on the other hand and serves for the sealing, support and noise decoupling of the feed pump (22) in the filter cup (13).

22 Claims, 3 Drawing Sheets

SUPPLY UNIT

PRIOR ART

The invention is directed to a feed unit for delivering fuel from a supply tank, especially for internal combustion engines, of the generic type defined in the preamble of claim 1

In a known feed unit of this type (DE 44 44 854 A1) designated as a so-called tank installation unit, the electric drive motor of the feed pump with its cylindrical outer jacket is received in an exact fit in the central chamber of the filter cup and is supported by its front end at a stop collar on the pump housing separate from the drive motor on the one hand and at elastic supporting elements on the underside of the filter cover on the other hand. The pump outlet opens into the central chamber from which the fuel that is sucked in flows into the annular chamber via the inlet duct provided with a check valve, then flows through the main filter and reaches the delivery line via the outlet duct. An outlet connection piece forming the end of the outlet duct at the filter cover is connected via a flexible corrugated pipe with a connection piece for the delivery line, this connection piece being arranged in a tank flange. The tank flange closes the opening provided in the supply tank for the installation of the feed unit. The filter cup is secured in the supply tank so as to be fixed against axial and radial displacement, for which purpose elastic coupling elements and means for securing against axial displacement are provided between the filter cup and the inner wall of the supply tank. Due to the fact that the filter cup is elastically or flexibly coupled to the supply tank, it is also absolutely necessary that the connection line between the outlet connection piece at the filter cover and the connection piece at the tank flange is constructed in a flexible manner. In another known feed unit (DE 37 30 930 A1), the feed pump which projects into a suction space by a suction connection piece is inserted laterally into a housing which is C-shaped in longitudinal section and the feed pump is supported axially and radially between the two legs or sides of the housing. A storage space for fuel flowing back from the internal combustion engine is provided in the housing; a return line which returns fuel opens into this storage space. The suction space communicates with the interior of the supply tank via a first suction space opening and communicates with the storage space via a second suction space opening. Both suction space openings are incorporated in wall portions of the suction space which are located opposite one another and the suction space openings are alternately opened and closed by a valve member arranged in the suction space. The valve member is actuated by a float and, when the suction space is filled, closes the second suction space opening and opens the first suction space. When the fuel level in the suction space falls below a given fuel level which, however, is still above the outlet end of the suction connection piece of the feed pump, the valve member opens the second suction space opening and closes the first suction space opening due to the fact that the float sinks along with the fuel level. Fuel can therefore flow out of the storage space into the suction space, so that a continued unimpeded flow of fuel through the feed pump is ensured.

ADVANTAGES OF THE INVENTION

The feed unit according to the invention with the characterizing features of claim 1 has the advantage that the housing of the electric-motor feed pump is decoupled from the filter cup. The feed pump is supported in an elastic manner axially and radially at both end sides of its housing, which also receives the electric motor, and therefore can not transmit its oscillating movement to the filter cup during operation, so that the filter cup can be rigidly fastened in the supply tank. The flexible corrugated pipe between the filter cover and the tank flange can accordingly be done away with, so that the tightness and strength problems associated with it are eliminated. The mounting of the feed pump is substantially simplified because only the suction connection piece of the feed pump projects through the opening in the base of the filter cup and the filter cup must be closed with the filter cover after the elastic sleeve has been fitted on the suction connection piece and pressure connection piece beforehand. When the filter cover is put on, the push-on cap formed at the filter cover automatically engages over the pressure connection piece and the elastic sleeve fitted thereto, so that the feed pump is automatically secured in the interior of the central chamber at a distance from the inner annular wall of the annular chamber. The two elastic sleeves serve to seal, support and, with respect to noise, decouple the feed pump in the filter cup. Advantageous further developments and improvements of the feed unit indicated in claim 1 are made possible through the features indicated in the additional claims. According to a preferred embodiment form of the invention, the filter cover has an annular closing collar which projects axially at the underside of the filter cover and which has a radial width corresponding to the clearance width of the annular chamber. The annular closing collar is inserted by its front side into the annular chamber with the intermediary of a ring seal toward the inner and outer annular chamber walls and is fixedly connected with the filter cup, preferably by means of beading or flanging of the inner and outer annular wall. The ducts formed in the filter cover for the inlet and outlet of fuel open into the closing surface of the closing collar covering the annular chamber. Supporting elements are preferably formed on at the underside of the closing collar so as to project radially and are supported at the main filter and accordingly secure the latter in the annular chamber so as to be fixed with respect to axial displacement. According to an advantageous embodiment form of the invention, the filter cover is constructed so as to be open in the area of the central chamber or has at least one access opening to the latter and a cylindrical wall area which is formed at the front side of the filter cover facing away from the filter cup and which defines a circular connection opening for a tank flange which closes an insertion opening for the feed unit in the supply tank. As a result of this structural feature, the feed unit inserted in the supply tank is automatically tightened axially and radially when the insertion opening is closed by the tank flange in the supply tank. Due to the fact that the pump outlet of the feed pump is connected directly to the annular chamber in the filter cup by means of its pressure connection piece at the inlet duct formed in the filter cover and the fact that the fuel return line is guided directly into the filter cup, the feed unit according to the invention with the characterizing features of claim 11 has the advantage that the central chamber in the filter cup is always filled with fuel, so that when the fuel level in the suction space arranged below the filter cup falls due to the opening of the blocking member, the suction space is refilled with fuel from the central chamber and the feed pump continues to deliver fuel in an unimpeded manner via its suction connection piece. A temporary drop in the fuel level in the suction space of the kind mentioned above occurs at low filling levels in the supply tank when the vehicle tilts toward the side as a result of driving through curves. The suction space then empties through the first suction space opening when the second suction space opening is closed by the blocking member, and the suction connection piece would emerge from the fuel volume if fuel did not flow back out of the central chamber according to the invention due to the sinking of the blocking member. The feed unit accordingly achieves a distinctly improved curving behavior at a minimum fill level in the supply tank. A compact tank constructional unit which can be produced economically and mounted without difficulty in a simple, economical manner is provided through the use of the central chamber of the filter cup as a storage space for the returning fuel.

In order to prevent the unblocking of the second suction space opening, for example, when the vehicle is parked on a hill, in spite of a possible flow of fuel out of the suction space into the supply tank, which results in the elimination of the buoyancy of the blocking member and therefore in the loss of its blocking function, it is suggested in a second embodiment example that the blocking member is provided with a hydraulically controllable contact pressing device. This contact pressing device is only effective in the inoperative state of the feed pump and its operation is canceled during feed operation due to a hydraulic pressure generated by the feed pump. As a result of this step, a sufficient supply of fuel to the feed pump is ensured even under extreme conditions.

Through the combination of the feed unit according to the invention with the characterizing features of claim 1 and the feed unit according to the invention with the characterizing features of claim 11 in accordance with a preferred embodiment form according to claim 10, the separate advantages are not only unified, but duplicate structural component parts are also economized on, so that a reduction in cost is achieved. A supply tank with an insertion opening for the feed unit according to the invention and a tank flange closing the insertion opening is indicated in claims 17 and 18.

DRAWING

The invention is explained more fully in the following description with reference to the embodiment examples shown in the drawings.

DESCRIPTION OF THE EMBODIMENT EXAMPLES

Figure 1:
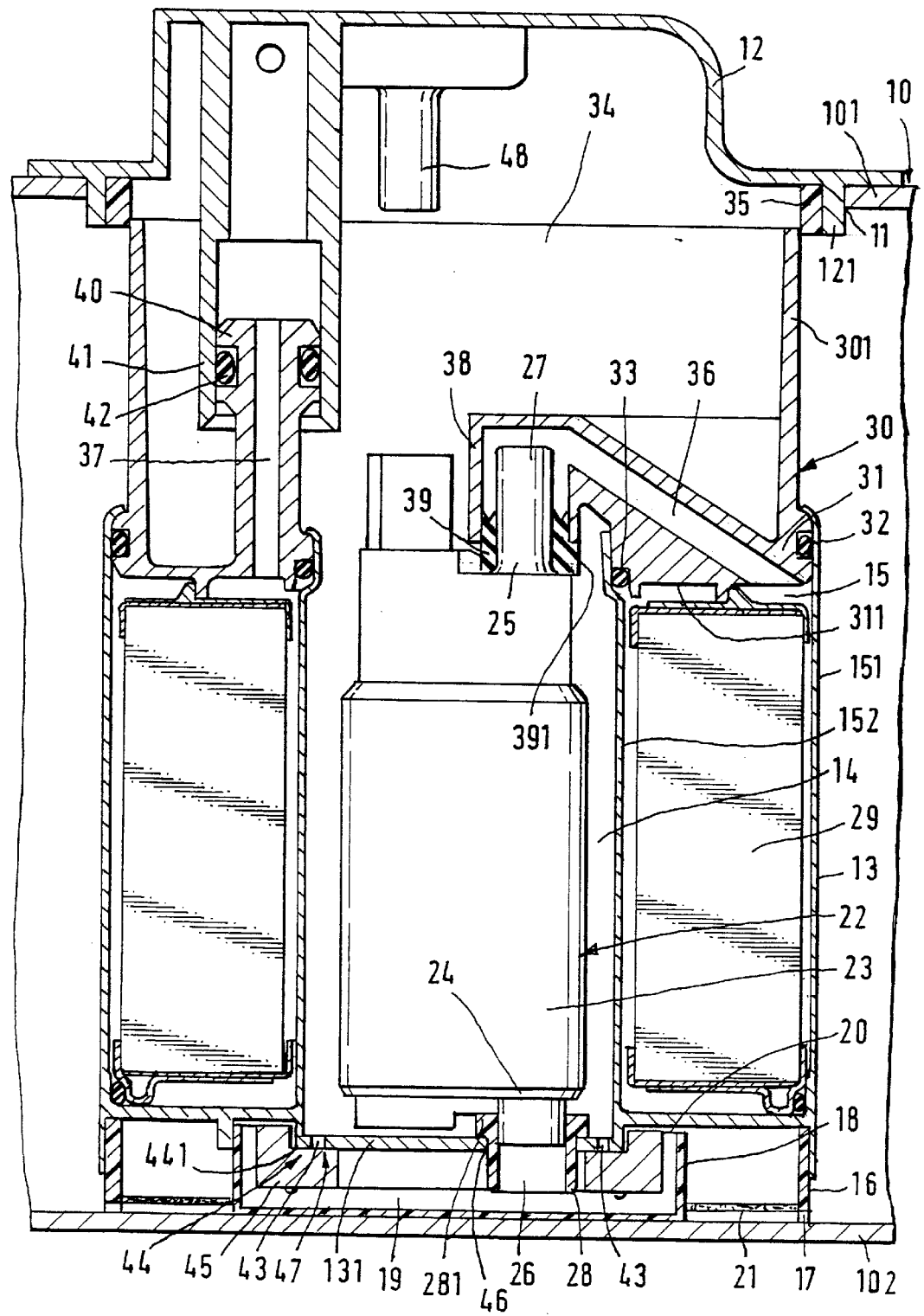
FIG. 1 shows a longitudinal section through a feed unit for delivery of fuel from a fuel supply tank.

The feed unit shown in longitudinal section in FIG. 1 for delivering fuel from a fuel supply tank 10 to an internal combustion engine, not shown, is arranged in the interior of the supply tank 10, only a portion of which is shown here in longitudinal section. For this purpose, the supply tank 10 has an insertion opening 11 which is arranged in its upper tank wall 101 and which is hermetically closed by a tank flange 12 after insertion of the feed unit. The feed unit is placed on the tank bottom 102 of the supply tank 10 and is fixed with respect to axial and radial displacement by means of the tank flange 12. The feed unit has a filter cup 13 with a central chamber 14 and an annular chamber 15 enclosing the latter. The outer annular chamber wall forming the cup wall of the filter cup 13 is designated by 151 and the inner annular chamber wall enclosing the central chamber 14 is designated by 152. An annular mounting connection piece 16 is arranged at the underside of the filter cup 13, sits on the bottom 102 of the supply tank 10 and has, in its connection piece wall near the bottom 102 of the tank, radial inlet openings 17 for the fuel from the supply tank 10. A suction space 19 is formed in the interior of the mounting connection piece 16 by means of a can-like cap 18 which is fitted to the cup base 131 from the bottom, wherein this suction space 19 communicates with the interior of the mounting connection piece 16 via a first suction space opening 20 located near the cup base 181. The annular space remaining between the cap 18 and the inner wall of the mounting connection piece 16 is covered above the inlet openings 17 with a filter fabric 21 forming a preliminary filter.

An electric-motor feed pump 22 is inserted in the central chamber 14 and has a housing 23 with a pump inlet 24 and a pump outlet 25 in which the pump chamber with pump impeller and the electric drive motor are integrated. The clearance diameter of the central chamber 14 is dimensioned so as to be greater than the outer diameter of the housing 23, so that a large annular radial gap remains between the inner annular chamber wall 152 and the feed pump 22. The pump inlet 24 communicates with a suction connection piece 26 projecting axially at one end side of the housing 23 and the pump outlet 25 communicates with a pressure connection piece 27 projecting axially at the opposite end side of the housing 23. The pressure connection piece 27 projects through an opening 46 provided in the base 131 of the filter cup 13 into the suction space 19 located below this opening 46. A sleeve 28 of elastic material, e.g., rubber, is slid onto the suction connection piece 26, wherein this sleeve 28 carries a radially projecting, one-piece end flange 281 at its end contacting the end side of the housing 23. The sleeve 28 fills the intermediate space between the edge surrounding the opening 46 in the cup base 131 and the outer jacket of the suction connection piece 26, while the end flange 281 is supported between the inside of the cup base 131 and the front side of the housing 23. The sleeve 28 with the end flange 281 serves to seal, support and decouple noise from the suction connection piece 26 and, therefore, the feed pump 22 in the filter cup 13. After an annular main filter 29 is inserted into the annular chamber 15, a filter cover 30 is mounted on the filter cup 13. At its underside facing the filter cup 13, the filter cover 30 has an axially projecting annular closing collar 31 with a radial width corresponding to the clearance width of the annular chamber 15. The filter cover 30 is inserted into the annular chamber 15 with the closing collar 31, wherein the closing surface 311 constructed on the underside of the closing collar 31 covers the entire upper clear annular surface of the annular chamber 15 and presses on the main filter 29 with an axially projecting, circumferentially extending support element 312 formed on it, so that the main filter 29 is secured against axial displacement in the annular chamber 15. A ring seal 32 and 33, respectively, is arranged between the annular closing collar 31 and the outer and inner annular chamber walls 151,152. The filter cover 30 is fixedly connected with the filter cup 13 by flanging of the outer and inner annular chamber walls 151 and 152 on the closing collar 31. The filter cover 30 is constructed so as to be open in the area of the central chamber 14 and has, at its end side remote of the filter cup 13, a cylindrical wall area 301 which borders a circular connection opening 34 of the filter cover 30 for connecting to the tank flange 12. For this purpose, the tank flange 12 carries, at its underside facing the filter cover 30, a closing connection piece 121 which engages over the cylindrical wall area 301. A seal 35 is arranged between the cylindrical wall area 301 and the closure connection piece 321. An inlet duct 36 to the annular chamber 15 and an outlet duct 37 from the annular chamber 15 are formed in the filter cover 30 and both ducts open into the closing surface 311 of the closing collar 31. A mounting cap 38 which is formed integral with the filter cover 30 is arranged in front of the outlet duct 37 on the input side, wherein the mounting cap 38 is formed and arranged in such a way that it engages over the pressure connection piece 27 of the feed pump 22 with radial clearance when the filter cover 30 is mounted on the filter cup 13. A sleeve 39 of elastic material, e.g., rubber, is fitted to the pressure connection piece 27 of the feed pump 22 in the same way with regard to the suction connection piece 26, wherein the sleeve 39 carries a radially overlapping end flange 391 at its end facing the housing 23 of the feed pump 22. The sleeve 39 fills the intermediate space between the outer jacket of the pressure connection piece 27 and the inner wall of the mounting cap 38 and is supported by its end flange 391 between the end side of the housing 23 and the annular end side of the mounting cap 38. As was the case with the sleeve 28 and end flange 281, the sleeve 39 with end flange 391 likewise serves for the sealing, support and noise decoupling of the pressure connection piece 25 and, accordingly, of the feed pump 22 at or from the filter cup 13 and the filter cover 30 fixedly connected with the filter cup 13. At the end of the outlet duct 37, an outlet connection piece 40 is formed at the filter cover 30, wherein a stiff connection pipe 41 slides over the outlet connection piece 40 when the tank flange 12 is inserted into the insertion opening 11 in the supply tank 10. The tightness between the outlet connection piece 40 and the connection pipe 41 is produced by an O-ring seal 42. The connection pipe 41 communicates with a connection piece, not shown, for a feed line to the internal combustion engine, which connection piece is formed integral with the tank flange 12. Further, another connection piece, also not shown, for a fuel return line is formed integral with the tank flange 12, wherein fuel which is not consumed in the internal combustion engine flows back into the supply tank 10 via this fuel return line. This connection piece for the return line communicates with an inlet pipe 48 in the tank flange 12, which inlet pipe 48 opens freely toward the filter cover 30, so that the fuel flowing back over the return line arrives directly in the central chamber 14 of the filter cup 13 and is stored there. The central chamber 14 therefore simultaneously assumes the function of a storage space for the returning fuel. The suction space 19 is connected with the central chamber 14 via a second suction space opening 47 formed in the cup base 131 within the region of the central chamber 14. In the embodiment example, the suction space opening 47 has a plurality of bore holes 43 arranged on a divider circle. A blocking or closing member 44 is arranged on the underside of the cup base 131 and is formed on the upper side of a buoyant body or float 45 inserted in the suction space 19, which upper side faces the cup base 131. In the present case, the closing member 44 is formed by a plane annular surface 441 of the float 45 capable of covering all bore holes 43. When the suction space 19 is filled with fuel, the float 45 is pressed against the underside of the cup base 131 by the buoyancy force and closes the bore holes 43. When the fuel level in the suction space 19 sinks below the level of the first suction space opening 20, the float 45 drops from the cup base 131 and fuel can flow from the central chamber 14 via the opened bore holes 43 into the suction space 19. The fuel level in the suction space 19 drops in the manner mentioned above when driving through curves, especially when there is low fuel volume in the supply tank 10, wherein the tank base 102 is inclined and fuel flows out of the suction space 19 via the first suction space opening 20. Due to the flow of fuel out of the central chamber 14 into the suction space 19, the suction connection piece 26 of the feed pump 22 remains immersed in the fuel volume, so that the internal combustion engine continues to be supplied with fuel uninterruptedly. The filter cup 13 and the filter cover 30 are preferably produced from plastic or a light metal, preferably aluminum, as an extruded, die-cast or injection-molded part.

Figure 2:
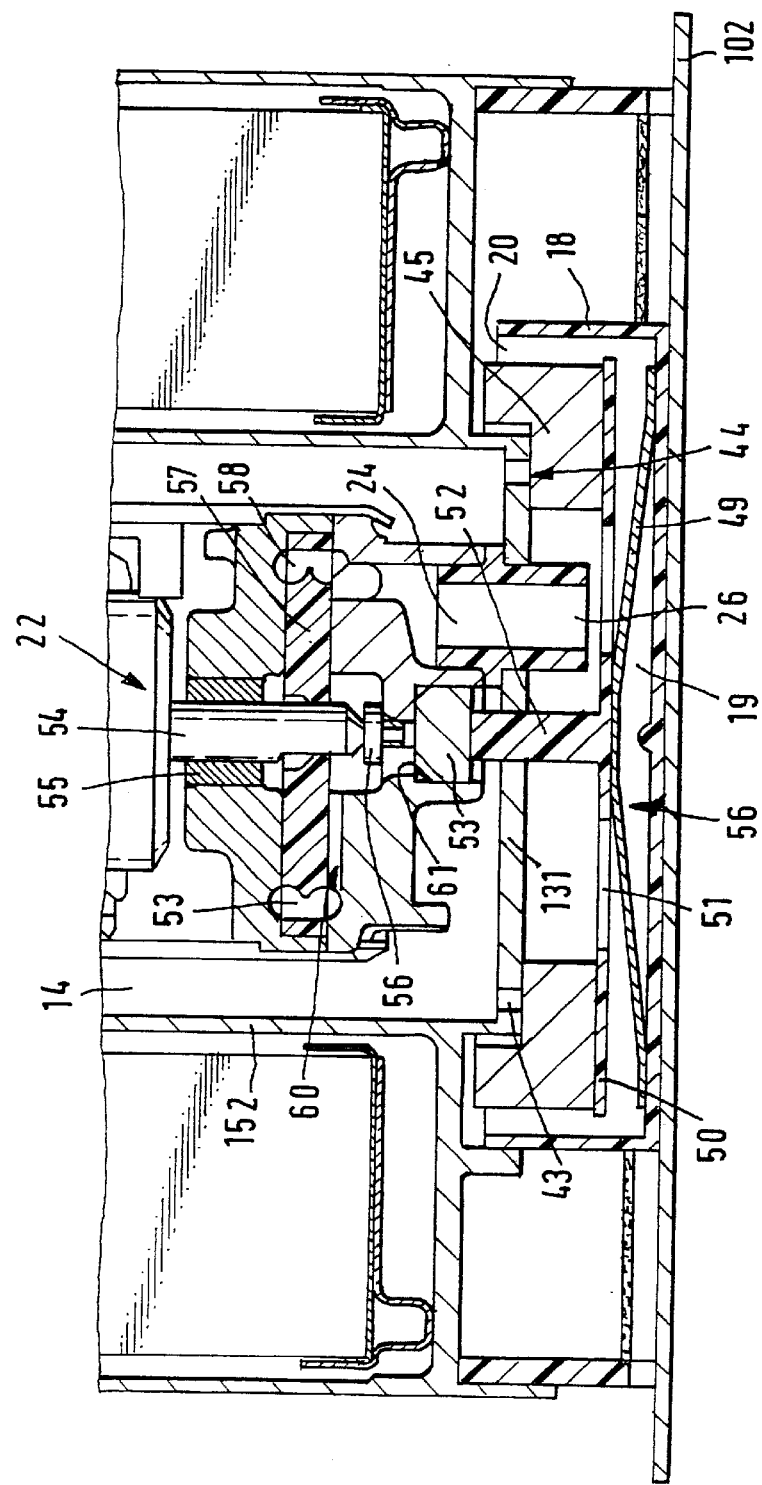
FIGS. 2 and 3 show a second embodiment example of the invention in longitudinal section. The portion of the feed unit according to FIG. 1 which faces the tank bottom is shown in the stationary state in FIG. 2 and during pumping operation of the fuel pump in FIG. 3.
Figure 3:
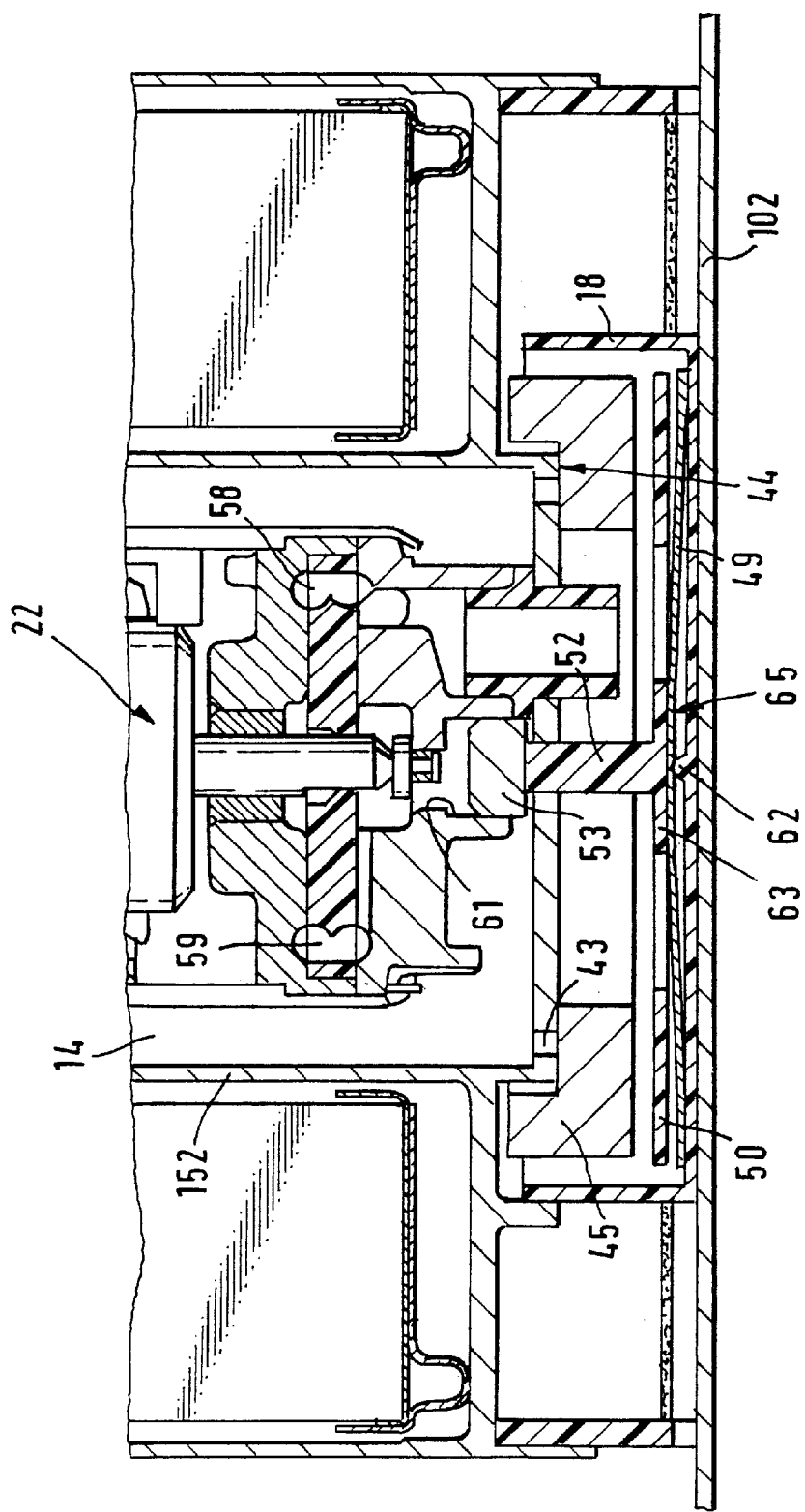

In a second embodiment example according to FIGS. 2 and 3, in addition to the loading by its buoyancy force, the float 45 is loaded by a contact pressing device 65 comprising a disk spring or plate spring 49 and a pressure plate 50. The plate spring 49 is supported on the one hand at the base of the cap 18 and accordingly at the tank bottom 102 and on the other hand at the pressure plate 50 which cooperates with the float 45. This pressure plate 50 is disk-shaped and corresponds in diameter to that of the float 45 and has a plurality of continuous recesses 51. The recesses 51 can be bore holes, for example, which are spaced apart such that their center points lie on a circle concentric to the center of the pressure plate 50. The diameter of this concentric circle is adapted to the eccentric position of the suction connection piece 26 relative to the longitudinal axis of the pump, so that at least one of the recesses 51 is aligned with the inlet 24 of the feed pump 22 to enable fuel to flow as far as possible without hindrance from the suction space 19 to the suction connection piece 26. The pressure plate 50 has, on its side facing the feed pump 22, a centrically arranged tappet or push rod 52 which ends with a piston 53 at its free end. The push rod 52 and the piston 53 lie coaxial to the drive shaft 54 of the feed pump 22. This drive shaft 54 is guided so as to be rotatable in the pump housing by means of radial bearings 55 and axial bearings 56. In the area between the radial bearing 55 on the tank bottom side and the corresponding axial bearing 56, the drive shaft 54 carries a wing disk 57 which delivers the fuel from the suction side 58 facing the suction connection piece 26 to a pressure side 59 accompanied by the building up of the delivery pressure. The pressure side 59 is connected via a groove 60 with a cylinder 61 in which the piston 53 of the pressure plate 50 is guided so as to be displaceable.

When a vehicle outfitted with this feed unit is stopped or parked, i.e., when the feed pump 22 is stopped, this means that the cylinder 61 is without pressure, so that the pressure plate 50 is pressed by the force of the plate spring 49 against the float 45 and the latter, apart from its buoyancy, is accordingly pressed against the cup base 131. The bore holes 43 which connect the suction space 19 with the central chamber 14 in which a fuel supply is stored are reliably closed. Even in an inclined position of the vehicle, for example, when parked on a hill, an emptying of the suction space 19 via the suction space opening 20 and consequent elimination of the buoyant force of the float 45 does not lead to the opening of the bore holes 43 through which the contents of the central chamber 14 could flow to the supply tank 10. This must be prevented because otherwise, under extreme circumstances, when the tank contents are low the fuel supply can be interrupted and accordingly the starting or operation of the vehicle may be prevented.

During the starting of the vehicle engine, a pressure is built up by the operation of the feed pump 22 in the cylinder 61, which pressure acts on the piston 53 against the force of the plate spring 49. As is shown in FIG. 3, the pressure plate 50 is lifted by the float 45 via the push rod 52 in such a way that it can carry out its previously mentioned control function for the bore holes 43 without being influenced.

In order to prevent the plate spring 49 from being pressed flat against the base surface of the cap 18 by the piston 53 and the push rod 52, which would result in the contact pressing device 65 sticking to the cap 18 in an undesirable manner, at least one protuberance 62 facing the plate spring 49 is provided at the bottom surface of the cap 18. This protuberance 62 ensures a gap 63 filled with fuel between the contact pressing device 65 and the bottom surface of the cap 18, this gap 63 ensuring proper functioning of the contact pressing device 65.

What is claimed is:

1. Feed unit for delivering fuel from a supply tank (10), especially for internal combustion engines, with a filter cup (13) having a central chamber (14) and an annular chamber (15) enclosing the latter, with a filter cover (30) which closes the end side of the annular chamber (15) and which contains an inlet duct (36) to the annular chamber (15) and an outlet duct (37) from the annular chamber (15), which outlet duct (37) is enclosed by an outlet connection piece (40), with an electric fuel feed pump (22) which is inserted in the central chamber (14) and has a housing (23) with a pump inlet and pump outlet (24, 25), wherein the pump inlet (24) communicates with a suction connection piece (26) which is arranged at the end side of the housing and which projects through an opening (46) in the cup base (131) into a suction space (19), characterized in that the clearance diameter of the central chamber (14) is greater than the outer diameter of the housing (23) of the feed pump (22), in that a pressure connection piece (27) which projects axially and communicates with the pump inlet (24) is formed at the end side of the housing (23) remote of the suction connection piece (26) and a mounting cap (38) which communicates with the inlet duct (36) and engages over the pressure connection piece (27) is formed at the filter cover (30), and in that a sleeve (39 and 28, respectively) of elastic material is inserted between the pressure connection piece (27) and the mounting cap (38) on the one hand and the boundary edge of the opening (46) in the cup base (131) and the suction connection piece (26) on the other hand.

2. Feed unit according to claim 1, characterized in that the sleeve (28) on the cup base side has an end flange (281) which projects radially over the sleeve (28) in one piece and which lies between the cup base (131) of the filter cup (13) and the end side of the housing (23) facing the latter.

3. Feed unit according to claim 1, characterized in that the sleeve (39) on the pressure connection piece side has an end flange (391) which projects in one piece radially over the sleeve (39) and which is located between the annular end side of the mounting cap (38) and the end side of the housing (23) of the feed pump (22), the latter end side facing the annular end side of the mounting cap (38).

4. Feed unit according to claim 1, characterized in that the filter cover (30) has an annular closing collar (31) which projects axially at the underside of the filter cover (30) and which has a radial width corresponding to the clearance width of the annular chamber (15), this annular closing collar (31) being inserted by its front side into the annular chamber (15) with the intermediary of a ring seal (32, 33) toward the outer and inner annular chambers (151, 152) and is fixedly connected with the filter cup (13), preferably by means of flanging of the inner and outer annular walls (151, 152), and in that the ducts (36, 37) formed in the filter cover (30) open into the closing surface (311) of the closing collar (31) which completely covers the annular chamber (15).

5. Feed unit according to claim 4, characterized in that supporting elements (312) are arranged on the closing surface (311) of the closing collar (31) so as to project radially, preferably in one piece, wherein the supporting elements (312) press against the end side of an annular main filter (29) which is inserted in the annular chamber (15).

6. Feed unit according to claim 4, characterized in that the filter cover (30) is open in the area of the central chamber (14) and has at least one access opening to the central chamber (14).

7. Feed unit according to claim 1, characterized in that the filter cover (30) is produced in one piece with the outlet connection piece (40), the mounting cap (38), outlet duct (37), inlet duct (36) and closing collar (31) as an extruded part, die-cast part or injection-molded part.

8. Feed unit according to claim 1, characterized in that the filter cover (13) is produced in one piece with the cup base (131) and inner annular chamber wall (152) as an extruded part, die-cast part or injection-molded part.

9. Feed unit according to claim 6, characterized in that the filter cover (30) has a cylindrical wall area (301) on its end side remote of the filter cup (13), which cylindrical wall area (301) defines a circular connection opening (34) for a tank flange (12) closing an insertion opening (11) in the supply tank (10).

10. Feed unit according to claim 1, characterized in that the suction space (19) has a first suction space opening (20) for the flowing in of fuel from the supply tank (10) and communicates with the central chamber (14) of the filter cup (13) via a second suction space opening (47), in that a closing member (44) closing the second suction space opening (47) is arranged in the suction space (19), wherein the closing member (44) releases the second suction space opening (47) when the fuel level in the suction space (19) drops below a predetermined level, and in that a return line opens into the central chamber (14) and guides fuel back to the supply vessel (10).

11. Feed unit according to the preamble of claim 1, characterized in that the suction space (19) has a first suction space opening (20) for the flowing in of fuel from the supply tank (10) and communicates with the central chamber (14) of the filter cup (13) via a second suction space opening (47), in that a closing member (44) closing the second suction space opening (47) is arranged in the suction space (19), wherein the closing member (44) releases the second suction space opening (47) when the fuel level in the suction space (19) drops below a predetermined level, in that a return line opens into the central chamber (14) and guides fuel back to the supply vessel (10), and in that the pump outlet (25) of the feed pump (22) is connected directly to the inlet duct (36) formed in the filter cover (30) and leading to the annular chamber (15).

12. Feed unit according to claim 10, characterized in that the closing member (44) cooperates with a contact pressing device (65).

13. Feed unit according to claim 12, characterized in that the contact pressing device (65) comprises a plate spring (49) and a pressure plate (50) with a piston (53) contacting the plate spring (49), and in that the piston (53) is guided so as to be displaceable in a cylinder (61) which can be acted upon hydraulically.

14. Feed unit according to claim 13, characterized in that the cylinder (61) is constructed in one piece in the housing of the fuel feed pump (22) and can be connected with the suction side and pressure side of the fuel feed pump (22) by means of pressure medium connections (60).

15. Feed unit according to claim 12, characterized in that the contact pressing device (65) loads the closing member (44) in the direction of the closing position of the feed unit in the inoperative state of the feed unit.

16. Feed unit according to claim 10, characterized in that the suction space (19) is enclosed by a can-shaped cap (18) which is mounted on the underside of the cup base (131) of the filter cup (13), in that the first suction space opening (20) is formed near the cup base (131) in the cap (18) and the second suction space opening (47) is formed in the area of the cup base (131) spanning the central chamber (14).

17. Feed unit according to claim 16, characterized in that a mounting connection piece (16) which coaxially encloses the cap (18) and serves for mounting the filter cup (13) on the bottom (102) of the supply tank (10) projects axially on the underside of the base (131) of the filter cup (13), and in that a filter fabric covering the annular space between the cap (18) and the mounting connection piece (16) is tensioned between the cap (18) and the mounting connection piece (16).

18. Feed unit according to claim 10, characterized in that the closing member (44) is formed at a float (45) which is located in the suction space (19) and which contacts the underside of the cup base (113) accompanied by buoyant energy.

19. Feed unit according to claim 18, characterized in that the closing member (44) is formed by a sealing surface (441) formed on the upper side of the float (45).

20. Feed unit according to claim 19, characterized in that the second suction space opening (47) has a plurality of spaced bore holes (43) which are preferably arranged on a divider circle, are incorporated in the cup base (131) and can be covered by the sealing surface (441) on the float (45).

21. Supply tank with an insertion opening (11) arranged in the tank wall for a feed unit according to one of claims 1 to 20, with a tank flange (12) which closes the insertion opening (11) and which has a connection piece for a fuel feed line connected to the outlet connection piece (40) and a connection piece for a fuel return line, characterized in that the tank flange (12) hermetically closes the filter cover (30) on its end side remote of the filter cup (13) and has a connection pipe (41) which communicates with the connection piece for the feed line and which projects axially on the underside of the flange and is slid onto the outlet connection piece (40) with the intermediary of a ring seal (42), and in that the connection piece for the return line has an inlet pipe (48) opening out on the underside of the tank flange (12).

22. Supply tank according to claim 21, characterized in that the tank flange (12) has a closure connection piece (121) which engages over the cylindrical wall area (301) of the filter cover (30) and which projects axially at its underside, and in that a seal (35) is inserted between the outer side of the cylindrical wall area (301) and the inner wall of the closure connection piece (121).

* * * * *